United States Patent
Switkes et al.

(10) Patent No.: US 12,276,977 B2
(45) Date of Patent: Apr. 15, 2025

(54) SYSTEMS AND METHODS FOR PLATOONING AND AUTOMATION SAFETY

(71) Applicant: Peloton Technology, Inc., Mountain View, CA (US)

(72) Inventors: Joshua P. Switkes, Mountain View, CA (US); Evan Nakano, Cupertino, CA (US)

(73) Assignee: Peloton Technology, Inc., Pacific Grove, CA (US)

( * ) Notice: Subject to any disclaimer, the term of this patent is extended or adjusted under 35 U.S.C. 154(b) by 0 days.

(21) Appl. No.: 16/134,341

(22) Filed: Oct. 23, 2018

(65) Prior Publication Data

US 2020/0125086 A1    Apr. 23, 2020

(51) Int. Cl.
*G05D 1/00* (2024.01)

(52) U.S. Cl.
CPC ......... *G05D 1/0027* (2013.01); *G05D 1/0055* (2013.01); *G05D 1/0061* (2013.01); *G05D 1/0293* (2013.01)

(58) Field of Classification Search
None
See application file for complete search history.

(56) References Cited

U.S. PATENT DOCUMENTS

| | | | | |
|---|---|---|---|---|
| 2013/0342368 | A1* | 12/2013 | Nathanson | G07C 5/0808 340/903 |
| 2014/0172265 | A1* | 6/2014 | Funabashi | G08G 1/22 701/96 |
| 2017/0369054 | A1* | 12/2017 | Nishimura | B60W 30/095 |
| 2018/0188746 | A1* | 7/2018 | Lesher | G08G 1/22 |
| 2019/0044728 | A1* | 2/2019 | Karmoose | H04L 9/3242 |
| 2019/0179339 | A1* | 6/2019 | Kim | G08G 1/167 |

* cited by examiner

*Primary Examiner* — Hongye Liang
(74) *Attorney, Agent, or Firm* — Redbrick IP, P.C.

(57) ABSTRACT

Systems and methods for increasing the safely platooning are described. In one aspect, safely platooning includes verifying that a vehicle is not decelerating less than necessary, verifying that the vehicle is not accelerating unintendedly, verifying that the vehicle is not decelerating unintendedly, verifying that the vehicle is not platooning unintendedly, verifying that notifications provided by a platooning electronic control unit are being transmitted to their intended destinations, verifying that information received from a network operations center is correct, and verifying that the instability of the vehicle does not exceed a threshold amount.

18 Claims, 9 Drawing Sheets

SYSTEMS AND METHODS FOR PLATOONING AND AUTOMATION SAFETY

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable and economical semi-automated vehicular convoying/platooning systems which enable vehicles to follow closely together in a safe, efficient, convenient manner.

While this is a lofty goal, it is generally easier said than done. In particular, as the platooning industry matures, unforeseen difficulties arise when attempting to create a platooning system (or any system that employs vehicle-to-vehicle communication) that is safe. As such, there is a need in the art to address safety issues as they arise.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
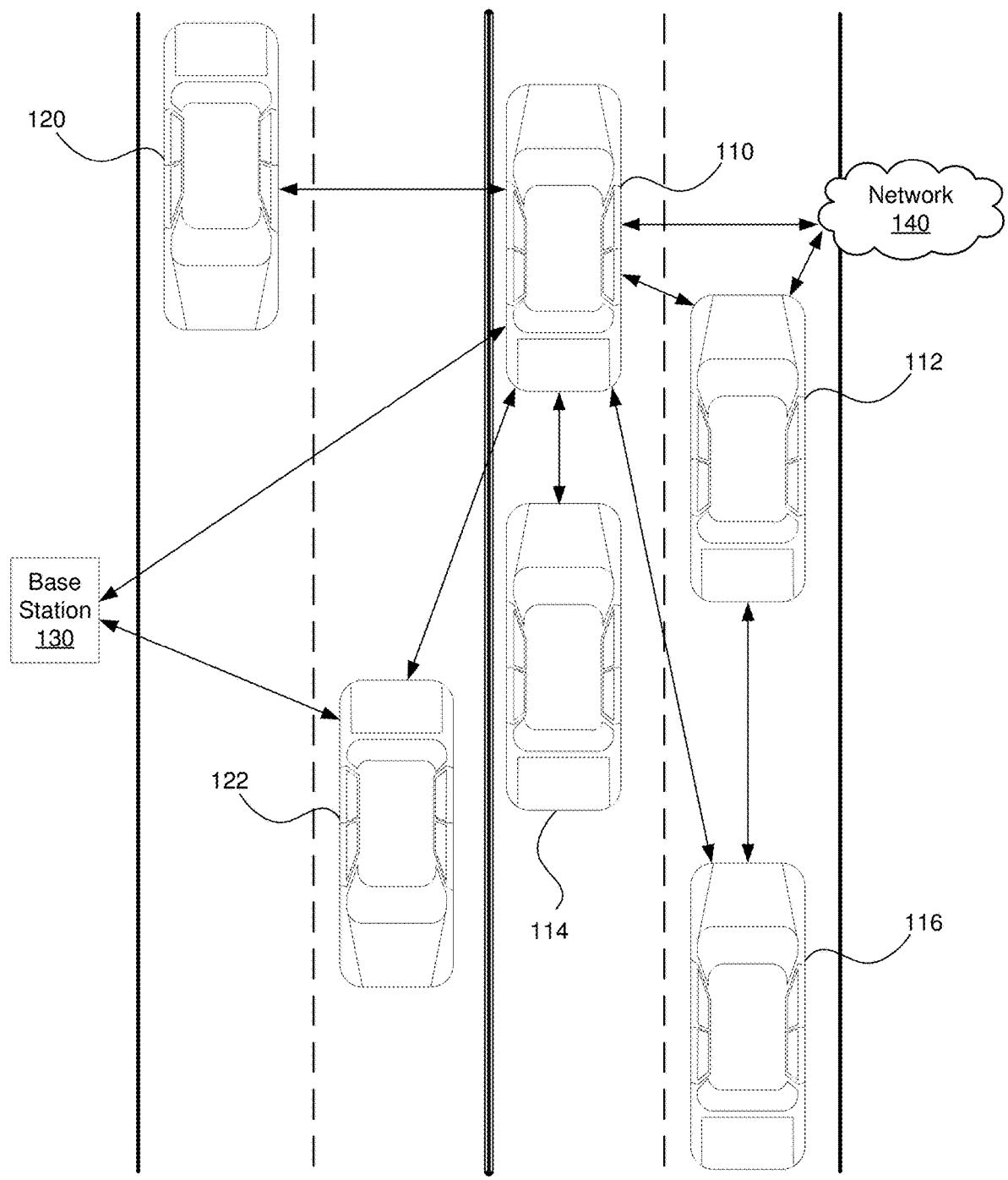
FIG. 1 illustrates a diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practice without implementing all of the features disclosed herein. Further, although many embodiments included in the instant application are related to the concept of platooning, it should be appreciated that many broader applications are envisioned.

Without limitation, the Applicant has proposed various vehicle platooning systems in which a second, and potentially additional, vehicle(s) is/are automatically, or semi-automatically controlled to closely follow a lead/front vehicle in a safe manner. By way of example, U.S. patent application Ser. Nos. 15/605,456, 15/607,902; 13/542,622 and 13/542,627; U.S. Provisional Patent Application Nos. 61/505,076, 62/377,970 and 62/343,819; and PCT Patent Application Nos. PCT/US2014/030770, PCT/US2016/049143, PCT/US2018/41684, PCT/US2017/04771, PCT/US2017/047825 and PCT/US2016/060167 describe various vehicle platooning systems in which a trailing vehicle (also referred to herein as a rear vehicle) is at least partially automatically controlled to closely follow a designated lead vehicle (also referred to herein as a front vehicle). Each of these earlier applications are incorporated herein by reference in their entirety for all purposes.

In the present application, section titles may be used. It should be understood that section titles are not meant to be limiting in any way whatsoever (including with regard to information presented in that section). Section titles are meant to make the instant disclosure easier to read, but should not be construed to indicate that a discussion in one section is not applicable to other sections, and vice versa.

One of the goals of platooning is typically to maintain a desired position between the platooning vehicles and/or a desired relative speed and/or time headway (e.g., a gap may refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (e.g., staying within a threshold amount of a distance/headway (e.g., +/−3 meters, +/−0.3 seconds)), staying at a gap, and/or keeping at least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate. It should be appreciated that herein, a gap may refer to a distance, a time headway, or either.

As described herein, the concept of platooning, also known as convoying, is still in its infancy. Academics have toyed with the concept over the last few decades, but to date there are no commercial systems on the road where a vehicle is at least partially controlled by another vehicle via a vehicle-to-vehicle connection (V2V). The benefits provided by such systems are obvious. Namely, the safety provided by these systems is far greater than a system where a rear vehicle doesn't begin to slow down until its radar or LIDAR sensors determine that a lead vehicle is slowing down. Further, by being able to follow another vehicle at a close distance, in some cases both a rear vehicle and a front vehicle may experience significant fuel savings.

As platoonable vehicles (e.g., vehicles capable of platooning) begin to roll out of the labs and into commercial production, their adoption faces significant challenges. For example, original equipment manufacturers (OEMs), fleets (e.g., freight hauling companies), and other customers of platooning systems require systems that platoon safely.

Herein, systems and methods for such a safe platooning systems are described.

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

In various embodiments, vehicles 110, 112, 114, 116, 120, and 122 may be configured to platoon, and may platoon with one another. In some embodiments, vehicles may transmit and/or receive data (e.g., to a NOC and/or fleet management system, etc.) including, but not limited to data indicating: whether they are available to platoon; whether they are platooning; whether a platoon they were part of dissolved; what direction they are traveling; what direction they are predicted (e.g., predetermined/planning on/suggested) to be traveling on for a particular period of time; when they are expected to stop (e.g., predetermined to stop, planning on stopping, suggested stopping time); where they plan on stopping; what route(s) they plan to travel (e.g., a route suggested and/or determined by a system, a route determined by a navigation/mapping system based on their destination such a system may be a rendezvousing system, a fleet management system, a navigation system, etc.); what type of platooning system they are equipped with; how many hours they have been on the road; weather they are capable of following the leader (e.g., if one or more vehicles can platoon without a driver); whether they are capable of being the leader in a follow-the-leader system; whether the vehicle is fully autonomous (e.g., capable of level 4 according to the SAE classification system); how much fuel they have saved; how much money they have saved; an area they are allowed to travel within; an area they are not allowed to travel outside of; whether they are capable of platooning on city streets; whether they are only capable of platooning on a highway; whether they are capable of platooning on non-public roads; whether they are capable of platooning in a particular construction site, mine, forest, etc.; and whether other attributes associated with a vehicle's account allows them to platoon. As should be understood, one or more of these attributes may be used to determine whether a vehicle can platoon with one or more additional vehicles, and whether a vehicle should platoon with one or more additional vehicles. It is contemplated that in some embodiments, a system may rank one or more vehicles with which a vehicle should platoon. In such an embodiment, if a target vehicle (e.g., a vehicle with a high ranking) that a first vehicle attempts to platoon with platoons with second vehicle before the first vehicle is able to platoon with the target vehicle, then the first vehicle may select another (e.g., the next) ranked vehicle that the system would like it to (e.g., determines that it should attempt to) platoon with.

In addition to these factors, other information that a vehicle may transmit and/or receive may include data including, but not limited to data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicles with a vehicle with an electric mo, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). This information can be used by one or more vehicles, systems, fleets, etc. to determine whether a vehicle may platoon with another vehicle and/or to determine the best vehicle with which a vehicle may platoon. Again, it is contemplated that in some embodiments, a system may rank one or more vehicles with which a vehicle should platoon, and this ranking may be based on vehicle the vehicle attributes described above. In such an embodiment, if a target vehicle that a first vehicle wishes to platoon with platoons with another vehicle before the first vehicle is able to platoon with the target vehicle, then the first vehicle may move to another (e.g., the next) ranked vehicle that the system would like it to (e.g., determines that it should attempt to) platoon with.

It should be understood that, herein, when a system determines a rendezvous location and/or rendezvous time, that any of these attributes/information/data may be used alone or in combination to determine: whether two or more vehicles can platoon together, a rendezvous location, a rendezvous time, etc.

Figure 2:
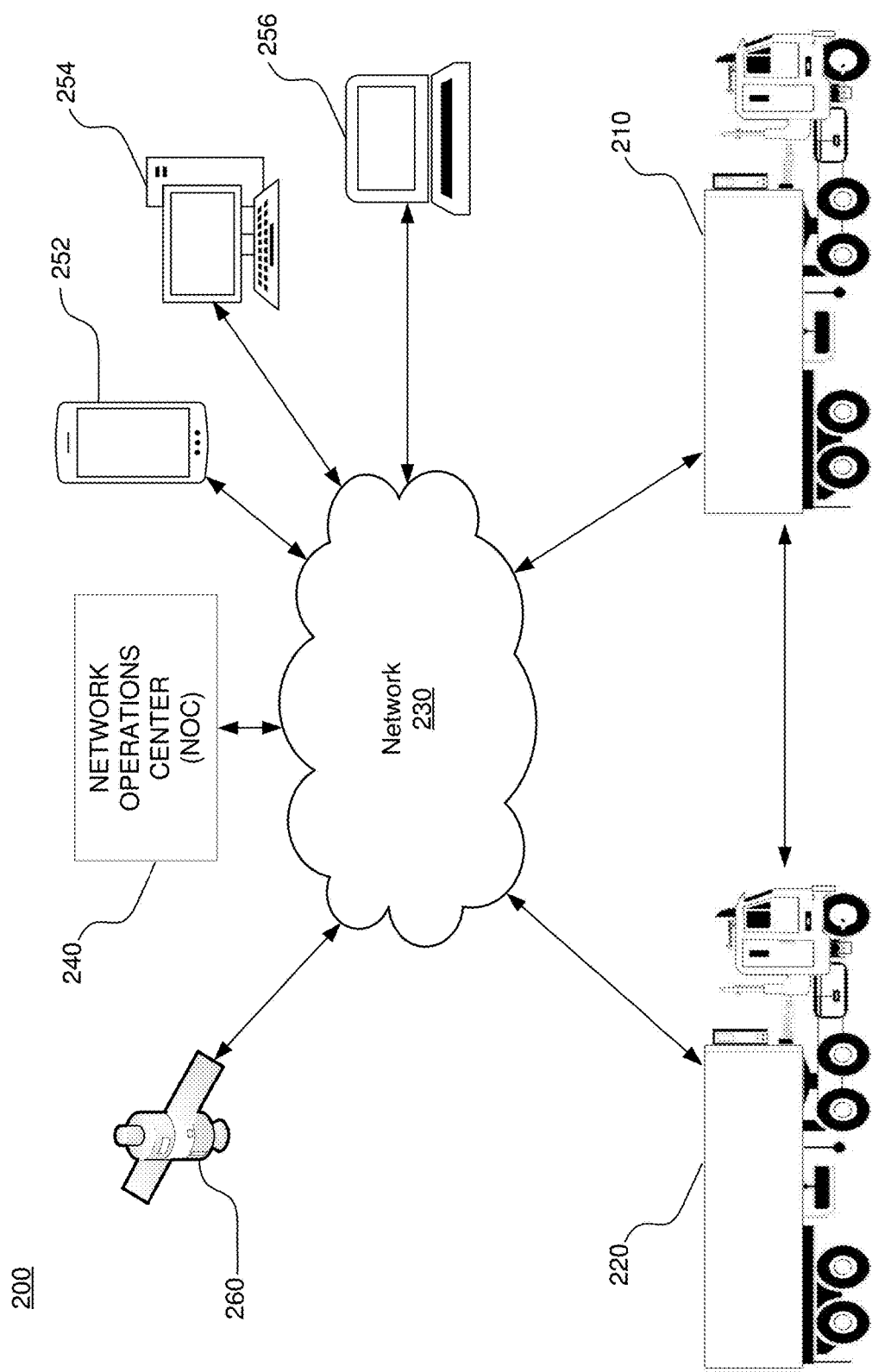
FIG. 2 illustrates a block diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., a NOC may be located in the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
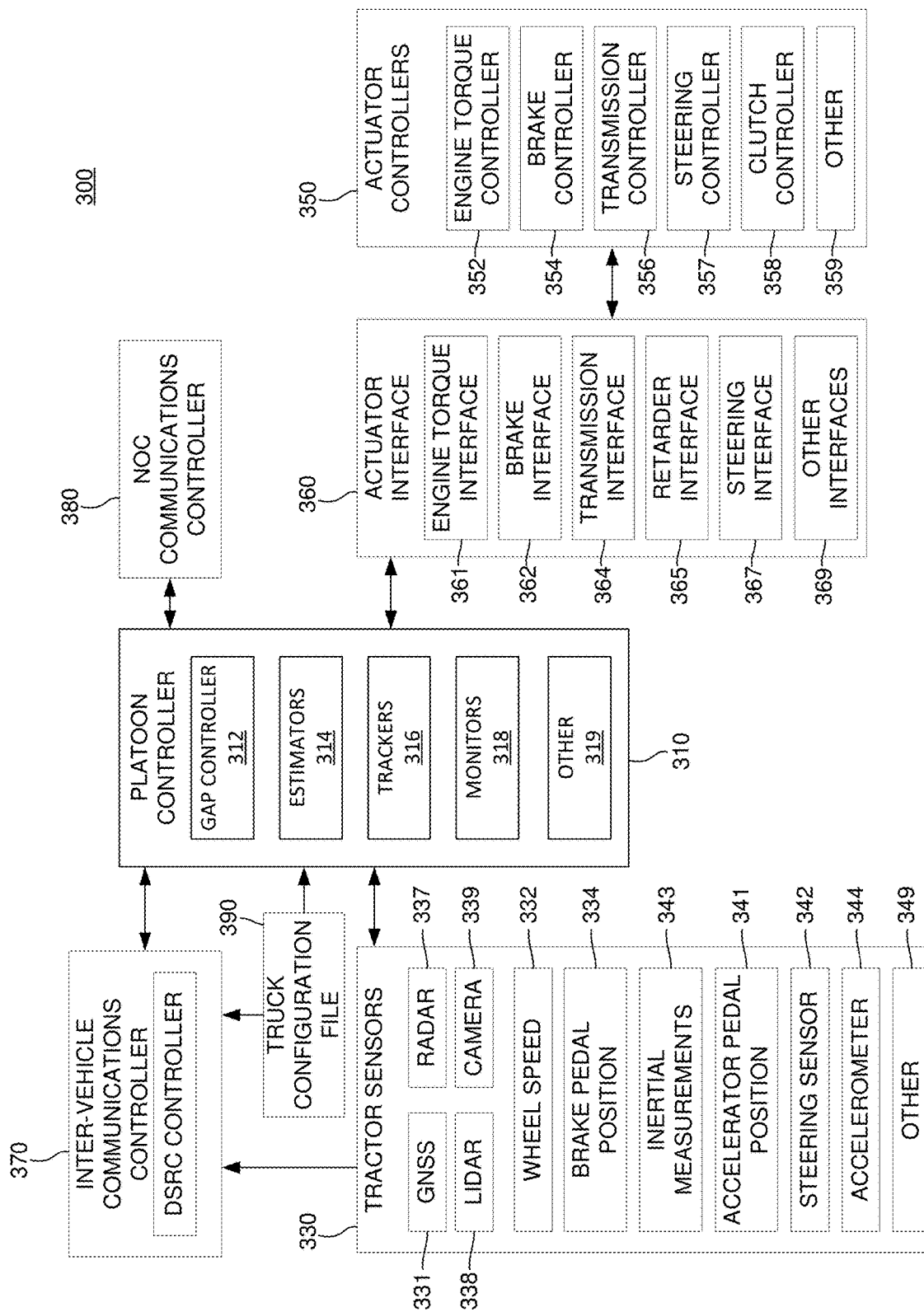
FIG. 3 illustrates a block diagram of a system including an electronic control unit, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—which may obviate the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms— as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, DSRC networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc. In some embodiments, configuration file 390 may include information about a driver, a fleet, a fleet's schedule, a driver rating, a driver's ability to use the system, whether a vehicle has permission to use a system, whether a vehicle is certified to use the system, etc.

Safety Associated with Weather

Figure 4:
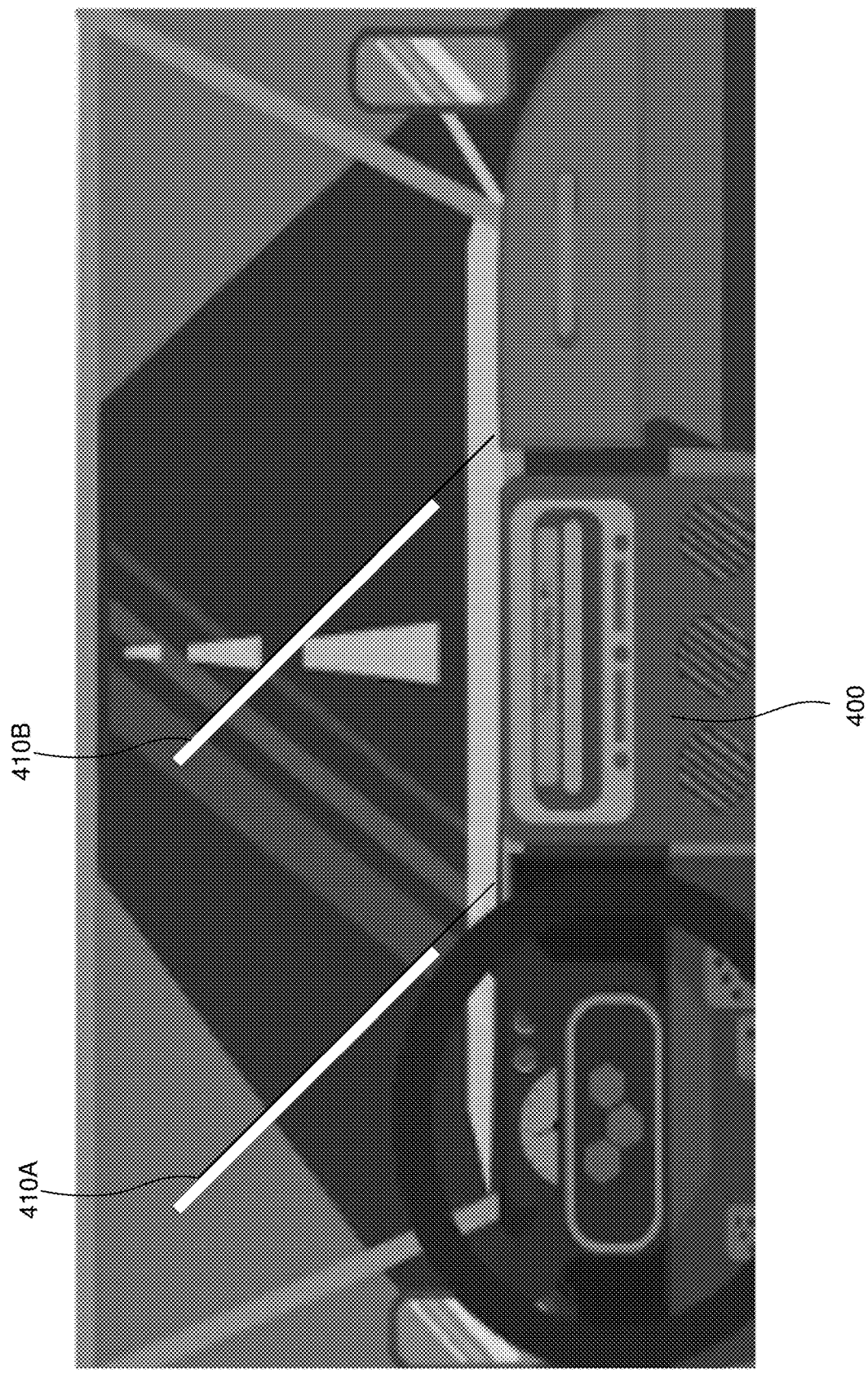
FIG. 4 illustrates a vehicle dashboard, in accordance with some embodiments.

FIG. 4 illustrates a vehicle dashboard, in accordance with some embodiments. FIG. 4 illustrates an example vehicle dashboard 400, and windshield wipers 410A and 410B. As described herein, in various embodiments systems and methods may be used to increase safety due to undesired weather or other impediments. For example, rain, sleet, hail, and/or snow may create less than ideal conditions to platoon in. In some embodiments, such weather conditions may be determined via various sensors and/or other devices included in a vehicle.

For example, in some embodiments the activation of windshield wipers may cause a vehicle to take various actions to improve safety. In some embodiments, a dissolve may occur in response to the activation of windshield wipers. Of course, not every activation of windshield wipers may cause a dissolve, since, for instance, a driver may accidently activate windshield wipers. As such, in some embodiments, various other factors may contribute to a determination as to whether a platoon should dissolve. For example, in some embodiments a dissolve may occur when a speed of windshield wipers exceeds a threshold amount (e.g., when the speed of windshield wipers exceeds half of their maximum speed), and/or various attributes of a platooning or other automation system are present.

In some embodiments, devices other than, or in addition to windshield wipers may be used to determine whether a dissolve or other action (e.g., an increase in gap) may be performed. For example, modern vehicles are often equipped with rain and/or other weather sensors. In some embodiments, the detection of rain and/or other weather conditions (e.g., ice) detected by a sensor (e.g., a rain sensor that would cause windshield wipers to activate) may cause a dissolve. Similarly, the activation of rain wipers on other parts of a vehicle may cause a dissolve and/or other action. For example, the detection of weather, and/or the activation of wipers on a headlight, mirror, and/or other portion of a vehicle may cause a dissolve or other action.

Further, the detection of the conditions of a road may cause a dissolve and/or other action. For example, sensors indicating that a threshold amount (e.g., any, 1 inch) of liquid (e.g., rain water) may cause a platoon to dissolve, or at least travel at below a certain speed, or at or above a threshold gap (e.g., distance/headway). In some embodiments it is contemplated that a vehicle sensor may determine at least a portion of a composition of a liquid (e.g., determine an amount of oil, grease, water) within a liquid, and perform various actions based on the composition (e.g., dissolve if the liquid includes a threshold amount of oil).

Safety Associated with Tire Pressure

Figure 5:
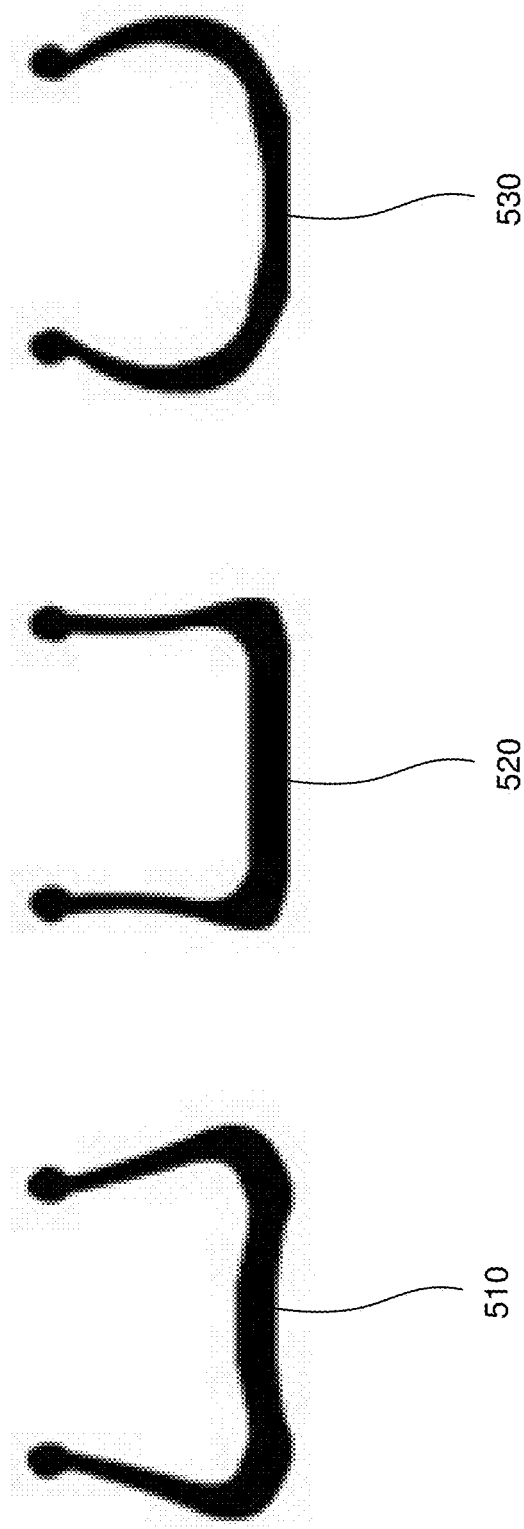
FIG. 5 illustrates example cross-sections of tires, in accordance with some embodiments.

FIG. 5 illustrates example cross-sections of tires, in accordance with some embodiments. FIG. 5 includes an illustration of an underinflated tire 510, a properly inflated tire 520, and an overinflated tire 530. Generally, tire pressure can be influenced by a variety of factors including normal air loss through the tire, payload, temperature, and damage to the tire. Tires will naturally lose 1-2 psi per month due to regular wear and tear. Additionally, tire pressure changes with ambient temperature—about 1 psi for every 10-degree change in temperature.

Tire pressure that is too high can (see, overinflated tire 530) result in less tire touching the ground. In turn, this can create a harsher ride as well as compromised traction and the ability to stop quickly. Moreover, an overinflated tire can lead to excessive inner tire tread wear—decreasing the overall life of tires.

Conversely, if tire pressure is too low (see, underinflated tire 510), too much of the tire may be in contact with the road, and too much deformation may occur as the tire rolls through the contact patch (e.g., the portion of the tire that is in contact with the road). Underinflated tires wear prematurely and have the potential to overheat. Underinflation can also cause a tire to bend more as it moves, resulting in a build-up of excessive heat, an increase in rolling resistance, and a decrease in fuel economy by as much as 5 percent.

As such, in various embodiments tire pressure may be monitored as condition precedent to platooning. As discussed herein, goals of platooning include safety and fuel efficiency. Underinflated tires 510 can reduce fuel efficiency. Overinflated tires can reduce a vehicle's ability to brake as intended/projected. In either case, in response to tires being underinflated by a particular amount (e.g., being inflated less than a threshold amount) or to tires being overinflated by a particular amount (e.g., being overinflated over a threshold amount), an action may be taken by a platooning system (e.g., a PECU) or other vehicle system. For example, platooning may be disabled if a threshold number of tires are under and/or overinflated. In some embodiments a notification may be provided (e.g., on a GUI, by a dashboard light, via audio) indicating that tires are under and/or over inflated, and that they should be corrected, must be corrected, etc. In some embodiments a notification may indicate a location where a vehicle may refill their tires. Moreover, it is contemplated that in some embodiments, if a tire is losing air rapidly (e.g., if a nail punctures a tire), a notification may be provided, which may be more prominent than a notification simply indicating that a tire is not inflated to a correct amount.

In some embodiments involving platooning, a model may project how long it takes a vehicle to stop. An amount of tire pressure may affect this model as it may increase or decrease a predicted distance/time it may take a vehicle to stop. As such, in order to ensure a rear vehicle may brake better than a lead vehicle, an ordering of vehicles may be arranged based at least in part on tire pressure. It should be understood that various sensors may be implemented to determine tire pressure (and/or weight, among other characteristics). For example, strain gauges may be used to measure tire pressure.

Of course, tire pressure is just one of a variety of vehicle attributes that can be determined, and in which an action may be taken in response. Herein, it should be understood that in addition to, or in the alternative, an action such as braking, dissolving, or another measure to provide increased safety may be based on attributes (e.g., system attributes, vehicle attributes) including, but not limited to a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicles with a vehicle with an electric mo, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle).

Safety Associated with Brake Inputs

As described herein, in some embodiments a vehicle's brakes may be employed due to a dissolve, traveling down a hill, during a draw-in, when slowing down for traffic, and/or in countless other situations. Generally, platooning systems cause at least a rear vehicle to apply its brakes in response to a front vehicle applying its brakes. Although, it is contemplated that a platooning system may cause various vehicles (e.g., front, rear) to apply their brakes in response to a variety of other conditions (e.g., if a vehicle in front of a front truck slows down).

While the system may provide a correct amount of braking (e.g., brake pressure), in some embodiments a driver may assert more control over a vehicle. For example, a driver may desire more brake than a platooning system applies in a certain situation, for example to avoid a merging vehicle. In some embodiments, a driver may accomplish this by applying pressure (additional pressure in some cases) to a brake pedal (e.g., such that even though a platooning system is applying brakes, a driver may apply more brakes). This may provide a driver with an extra sense of control over a vehicle. Although, in some cases a platoon may dissolve in response to a driver applying pressure to a brake pedal. The determination of whether to dissolve or not may be based on which vehicle (for example the lead or follow truck) is applying the brakes, and how hard that vehicle's brakes are being applied.

In some instances, it is contemplated that other devices in addition to, or in combination with, a brake pedal being depressed may allow a driver/user to cause a vehicle to apply more brakes than a platooning system applies. For example, an emergency stop mechanism may be used by a driver, which may cause brakes to engage and cause a gradual decrease in speed, a dissolve, and/or a hard brake. In some instances, such mechanisms may be disengaged. For example, in some embodiments a platooning system may control an amount of brakes despite pressure being put on a brake pedal, or any other type of stopping mechanism being activated.

Safety Associated with Braking Notifications

Figure 6:
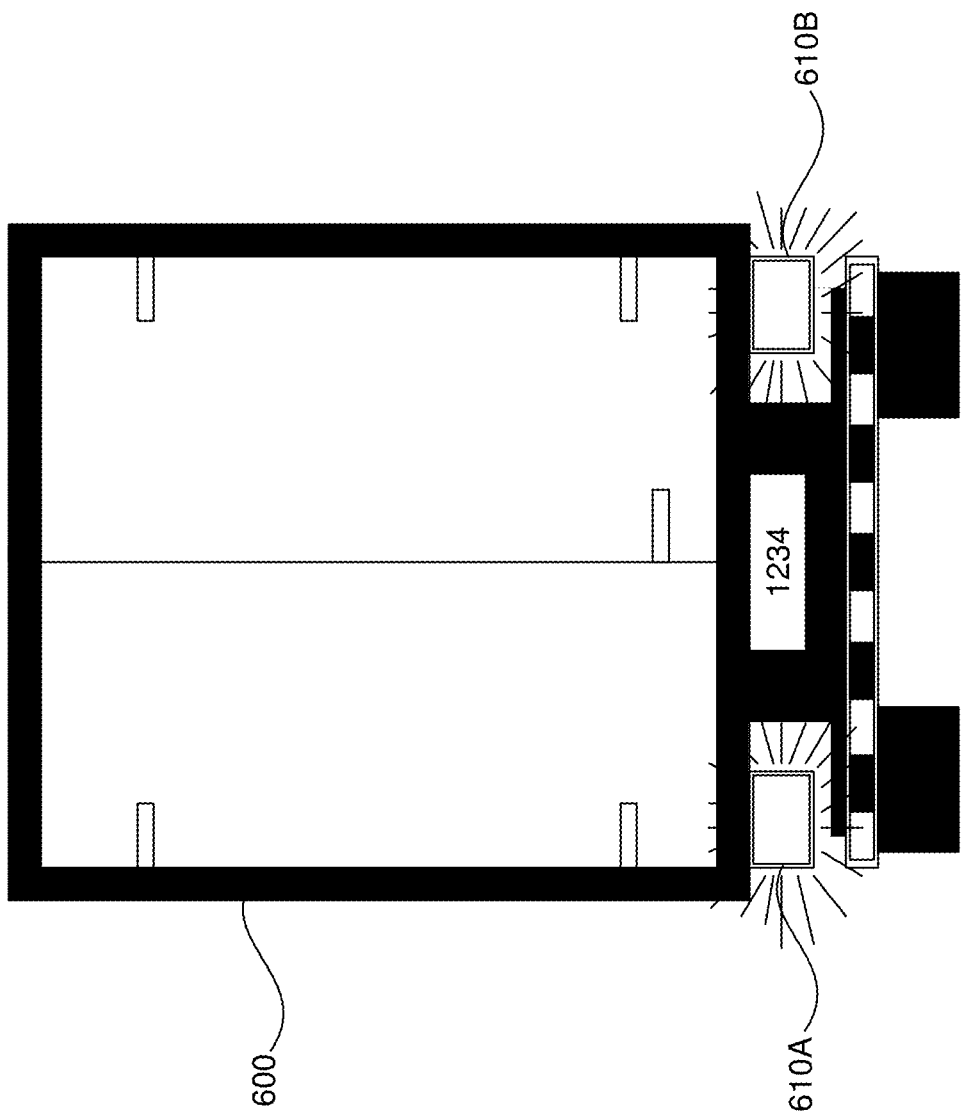
FIG. 6 illustrates a back side of a vehicle, in accordance with some embodiments.

FIG. 6 illustrates a back side of a vehicle, in accordance with some embodiments. FIG. 6 includes a vehicle 600, and activated brake lights 610A and 610B. In various embodiments, brake lights on one or more platooning vehicles may not be activated (e.g., illuminated) when no brakes are being applied. Moreover, in some embodiments, brake lights on one or more platooning vehicles may not be active despite brakes being applied (e.g., when a platooning system (e.g., a PECU)) causes brakes to be applied. Moreover still, in some embodiments, the depression of a brake pedal may not cause brake lights on one or more vehicles to be active. In various embodiments described herein, one or more vehicle's brake lights may be configured to activate based on a variety of scenarios, for example: when a brake pedal is depressed, only when a brake pedal is depressed, when a retarder is activated, only when a retarder is activated, when a platooning system causes a vehicle to use its foundation brakes, only when a platooning system causes a vehicle to use its foundation brakes, when both a brake pedal is depressed and a platooning system causes a vehicle to use its foundation brakes, only when a brake pedal is depressed and a platooning system causes a vehicle to use its foundation brakes, etc. Of course, any one of, or any combination of the aforementioned braking activities may cause one or more brake lights to activate and a front and/or rear vehicle.

Such a setup may provide additional safety since some vehicles (e.g., trucks) may not be configured to activate brake lights in response to a braking activity caused by a platooning system. For example, some vehicles may be configured to only apply brake lights in response to a brake pedal being depressed. To add safety and cure such a deficiency, brake lights may be activated when a platooning system causes a vehicle to brake.

Moreover, brake lights 610A and 610B need not be located in the locations shown in FIG. 5. For example, brake lights may be located on the top of the rear of a vehicle, on the sides of a vehicle, in the front of a vehicle, etc. In some embodiments, platooning vehicles may include lights or other mechanisms to indicate that they are platooning. In such embodiments, one or more brake lights may be included in a fixture/device/module that is capable of indicating that one or more vehicles are platooning.

Safety Associated with Network Authorization

As described herein, such as with reference to FIG. 2, a network operations center (NOC) (sometimes referred to as a network operations cloud) may authorize one or more vehicles to platoon. In various embodiments, an authorization to platoon may have a time limit (e.g., it may expire). For example, problems could occur if a NOC authorized one or more vehicles to platoon at 8:00 a.m. and didn't deauthorize platooning until 10:00 p.m. As such, a NOC may authorize vehicles to platoon for a period of time, at which they must be reauthorized. Put another way, in some embodiments, an authorization to platoon may be updated (e.g., at various time intervals). In embodiments where reauthorization occurs, such reauthorization may occur every 5 seconds, minute, 10 minutes, etc. In some embodiments, frequencies at which updates/reauthorizations/deauthorizations occur may be variable. For example, a system may be configured (e.g., by a user) to update whether a vehicle is authorized to platoon every minute or every 5 minutes. Further, in some embodiments, a vehicle system may not allow platooning if authorization received at a vehicle from a NOC is not updated at a threshold frequency (e.g., every 5 seconds, minute, 10 minutes, etc.).

In some embodiments, a system may automatically determine how often a vehicle's authorization status should be updated. For example, a system may determine that it should update (e.g., either at a NOC or at a vehicle) its authorization to platoon based on various attributes such as weather, an amount of sunlight, an amount of traffic, wind, attributes of a particular route/road, etc. In one example, if a system determines that there is a small amount of rain it may update whether a vehicle may platoon every minute, and if the system determines that a larger amount of rain is falling the system may update whether the vehicle may platoon every 10 seconds.

In a similar manner, an authorization may only be valid in response to factors being met including: a vehicle being located in a particular geographic region, a vehicle traveling within a particular speed range, a vehicle traveling for a particular time/within a particular time range, a vehicle traveling for an amount of time after the initiation of a platoon, and/or other transient factors.

Safety Associated with Brake Temperatures

Figure 7:
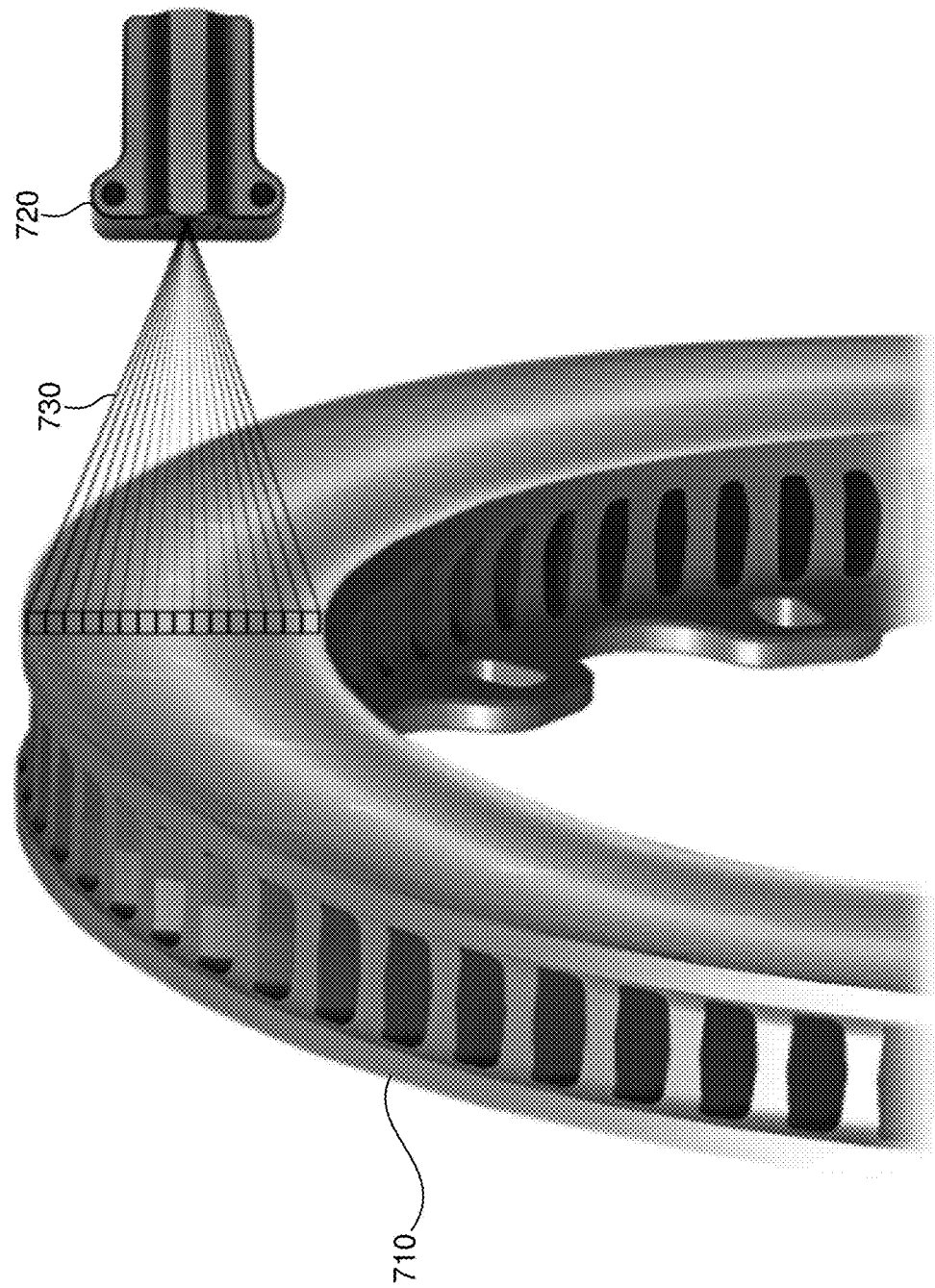
FIG. 7 illustrates an example brake, in accordance with some embodiments.

FIG. 7 illustrates an example brake, in accordance with some embodiments. FIG. 7 includes a disc brake 710, a heat sensor 720, and infrared light 730 used to measure temperatures. Of course, it should be appreciated that different types of brakes may be used with reference to descriptions of various embodiments described herein, and different types of sensors may be used with reference to descriptions of various embodiments described herein.

In some embodiments, an assessment (measurement, estimate, calculation) of brake temperatures may be used to determine actions performed by one or more platooning vehicles. For example, if brake temperatures become too high brake fade may occur. Brake fade is a term used to describe a temporary reduction or complete loss of braking power of a vehicle's braking system. Brake fade occurs when the brake pad and the brake rotor no longer generate sufficient mutual friction to stop the vehicle at its preferred rate of deceleration. The end result being inconsistent or unexpected braking system behavior, often resulting in increased stopping distances. As discussed herein (e.g., with reference to improper tire pressure), unpredicted braking distances/times can cause problems with a platooning system because vehicles may not stop as a system predicts. As such, it is important to assess at least one brake's temperature to correctly model and/or estimate how long a vehicle will take to stop, determine a desirable distance/headway of a gap, and/or determine an ordering of one or more platooning vehicles.

In some embodiments, a platoon may dissolve in response to a brake temperature being above a threshold amount. Further, in some embodiments, a brake temperature may cause a gap between two or more vehicles to increase and/or decrease when traveling over a hill and/or a grade and/or distance of a downhill section of a road. In one example, a notification may be provided to one or more vehicles in a platoon, and/or a NOC/remote terminal, indicating that a temperature of one or more brakes is too high. For example, a notification may appear on a graphical user interface (GUI), a heads-up user display (HUD), a dashboard, and/or an audio notification may be provided to a user within a vehicle and/or remotely. Of course, other notifications described herein may be provided in the same and/or similar ways.

Further, braking temperature may be used alone or in combination with other vehicle and/or system attributes described herein to determine a gap, whether a dissolve should occur, etc.

Safety Associated with Driver Takeovers

In some embodiments, a user may takeover a vehicle from a system (e.g., a platooning system), such that the user controls at least a portion of a vehicle. In various embodiments, a user may be a driver of a vehicle, a passenger in a vehicle, an operator of a vehicle (e.g., at a remote terminal), or otherwise be in control of a vehicle (e.g., a driver of a front vehicle controlling some or all of a rear vehicle).

In various embodiments described herein, a takeover may cause at least some of the automated functions of a vehicle to stop (e.g., command of these functions may be turned over to a user of a vehicle). For example, if a user depresses a brake pedal (e.g., at all, for a particular period of time, above a threshold amount, longer than a threshold amount of time, etc.) a platoon may dissolve. Similarly, in some embodiments if a user depresses a throttle/accelerator pedal (e.g., at all, for a particular period of time such as 2 seconds, 5 seconds, etc.), a platoon may dissolve. In one example, the activation of a hand brake and/or emergency mechanism may cause a takeover to occur (e.g., cause at least some of the automated functions of a vehicle to stop).

Of course, in some embodiments only a portion of automated controls of a vehicle may stop when a brake pedal or throttle is depressed. For example, in some embodiments automatic steering may stop such that a user may need to steer, while controls such as accelerating and braking may still be automated. In some embodiments, the stopping of various automated functions may occur only for a certain amount of time before returning to being automated. For example, a brake may be tapped and a user may obtain control of braking and/or accelerating for a few seconds (or a time which may be based on a gap), and then control of braking and/or accelerating may return to being automated.

In some embodiments, an indicator may be activated when a user gains control of a vehicle. For example, in response to a dissolve a light, sound, or other notification may be provided to other drivers (e.g., other platoon members, other vehicles on a road), a NOC, a user at a remote terminal, etc. For example, when a user gains at least some or total control of a vehicle a light on a side of a platooning vehicle indicating the vehicle is platooning may turn off. As another example, a vehicle may sound an alarm, flash one or more lights, cause one or more other vehicles to activate one or more lights, etc. in order to notify others that a user has regained control of a vehicle (e.g., a platoon dissolved).

Safety Associated with Platooning Conditions

As described herein, a variety of attributes associated with vehicles, conditions exterior to vehicles, conditions associated with a NOC, and/or conditions associated with a remote terminal may contribute to whether it is safe to platoon or unsafe to platoon. In various embodiments, a determination as to whether it is safe to platoon may be based on a combination and/or amount of factors. For example, platooning may be allowed if a vehicle is in a particular area, if there is less than a particular amount of rain, and a vehicle's drive wheels are inflated above a particular threshold. It should be understood that certain attributes may contribute to and/or cause a safe or unsafe condition when that attribute is below or above a threshold amount. For example, a vehicle may be allowed to platoon when a road's grade is below a threshold amount, when a trailer height is below a threshold amount, when a vehicle's available horsepower is above a threshold amount, when an amount of traffic is below a threshold amount, etc.

As such, in various embodiments, these attributes may include, but are not limited to a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicles with a vehicle with an electric motor, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle).

Safety Monitors and Operational Design Domains

As repeated throughout this disclosure, one of the goals of platooning is to increase driver safety. To that end, safety benchmarks may be generated, for example, based on publicly available Federal Motor Carrier Safety Administration (FMSCA) collision data.

In various embodiments, in particular for testing, some safety attributes may be activated or not activated. This disclosure described many of these attributes, but the attributes should not be considered limiting in any way. For example, in some embodiments safety measures described herein may be used during system testing but not normal system use. In some embodiments safety measures described herein may be implemented during normal system use, but not activated during testing. Of course, it should be understood that a system can be configured to use some, all, or none of the safety measures described herein (e.g., dissolving a platoon due to weather, activating brake lights in response to system braking, updating authorization status, etc.). Further, safety measures that are not discussed herein may be contemplated and implemented in various tests and/or full commercial deployment.

In some embodiments, to increase the safety of a system, various ECUs and software versions are checked and rechecked at various times. Similarly, safety monitors (e.g., a PECU safety monitor) may be updated and/or checked at various times. These times may include while a vehicle is traveling (e.g., every hour, every day, every week), in response to a software update (e.g., an over-the-air update), before a vehicle begins a platoon, after a vehicle platoons, before a vehicle starts travelling, and/or after a vehicle stops (e.g., when it is in park).

In some embodiments herein, various actions may occur if a vehicle does not operate as desired (e.g., if it does not meet safety requirements). For example, any of the attributes above may be tested, and instead of dissolving a platoon or some other action while a vehicle is moving, a vehicle may be prevented from moving and/or platooning in response to the vehicle not meeting a desired safety goal. For example, a vehicle may not be allowed to start and/or platoon if: its ECUs and/or software is not configured correctly; its safety monitor is not updated and/or is configured incorrectly; if a brake ECU (BECU) and/or other device does not activate brake lights when a system causes a braking event; if weather is undesirable and/or a road surface is suboptimal (e.g., too wet); if a driver is too aggressive while driving and/or platooning (e.g., if they are exceeding a speed limit, taking turns to fast, and/or otherwise being unsafe); etc.

In some embodiments, a platooning system may only operate in certain domains, which may be referred to as operational design domains (ODDs). Although nothing in this section is not intended to be limiting and should not be construed as being limiting, it should be understood that for some purposes, limiting a system to operate in an ODD may be required (e.g., for safety purposes). It should also be understood that an ODD may include none, some, all, or additional attributes such as those described in this paragraph. In some embodiments, an operational design domain may define operational capabilities, driver vehicle control responsibilities, operating environments, and/or operating environment constraints. An operational capability may include vehicle controls and/or user interfaces. For example, vehicle controls may include acceleration, deceleration, and/or disengaging a platoon (e.g., dissolving a platoon). User interfaces may include information including a system's status, whether a platoon is being engaged (e.g., drawing-in), whether a platoon is being disengaged (e.g., dissolving), and/or information/connectivity to/from a platoon cloud service (e.g., a NOC). Driver vehicle control responsibilities may include responsibilities for a front (lead) vehicle driver and/or a rear (following) vehicle driver. Front vehicle driver responsibilities may include steering, accelerating, and/or decelerating. Rear vehicle driver responsibilities may include steering. Operating environments may include weather conditions and/or road attributes. Weather conditions may include dry roads, wet roads, rain, crosswinds, and/or whether it is dusk/dawn. Road attributes may include a divided highway, a multi-lane highway, and/or a limited access road. Operating environment constraints may include road constraints, situational constraints, and/or weather conditions. Road constraints may include whether a road is urban, city, residential, and/or rural, includes undivided highways, construction zones, mountain passes with unsecured steep slopes, roads without a shoulder or viable runoff area, and/or weather a road is dirt/unpaved. Situational conditions may include vehicle cut-ins, when a vehicle speed is below 45 miles/hour, when a vehicle speed is above 70 miles/hour, an amount of highway entrance/exit ramps, whether an engine fault is indicated, whether an ABS fault is indicated, whether a weight or load is not within a specification, whether tire pressure is low and/or high, and/or whether a brake fault is indicated. Weather conditions may include whether there is snow and/or ice.

Safety Goals/Causes of Dissolves

In some embodiments, a platoon may be dissolved to maintain a certain level of safety. For example, a platoon may be dissolved in response to deceleration less than necessary during platooning. A platoon may be dissolved in response to unintended or excessive acceleration during platooning. A platoon may be dissolved in response to acceleration that is less than necessary during platooning. A platoon may be dissolved in response to unintended or excessive deceleration during platooning. A platoon may be dissolved in response to an unintended platoon being formed. A platoon may be dissolved in response to a failure to notify a user (e.g., a driver or user at a remote terminal) of a platoon status. A platoon may be dissolved in response to vehicle instability during intended deceleration while platooning. A platoon may be dissolved if inaccurate information is received from a NOC/network while platooning. Of course, this list is not exhaustive, in some embodiments a platoon may dissolve in response to a combination of the aforementioned situations, and in some embodiments action may be taken that does not include dissolving a platoon. For example, in response to unintended or excessive deceleration during platooning, braking may be lessened or prevented (either by the vehicle that is decelerating unintendedly or excessively, or by an external command).

In addition to the list above, in various embodiments, a platoon may be dissolved in response to: one or more platooning vehicles stopping; a curve above a threshold degree on a highway; a curve above a threshold degree in addition to rain/wet roads on a highway; vehicles being offset (e.g., where two vehicles are in two different lanes) and one of the vehicles stops; an aggressive braking event by a front and/or rear vehicle; erroneous braking by a front and/or rear vehicle; a vehicle tailgating a rear vehicle; a cut-in (e.g., where a vehicle changes lanes to be in between two platooning vehicles); a vehicle slowing down in front of a front vehicle; inadvertently engaging (e.g., beginning a draw-in) in a platoon while in an urban or city environment; a user attempting to dissolve a platoon and the platoon not dissolving as intended; in advertently engaging a platoon while on a highway; a platoon failing to disengage during a cut-in; platooning in an unauthorized segment of a road; inadvertently engaging at low speeds lower than allowable for engaging; failing to notify a user of an engagement; failing to notify a user of a disengagement; unintended lateral movement of a trailer; and/or any combination thereof.

In various embodiments, a system meets or exceeds safety goals. For example, such goals may be determined to be protected to a requisite ASIL level. Various methods presented below may describe various goals and attributes associated with those goals (e.g., how to detect, when to detect by, when to dissolve by, etc.). Further, it should be understood that during any of these safety goals, a vehicle operator may be able to take control of one or more vehicles, which may cause a dissolve. In such an embodiment, a vehicle operator may takeover after one or more actions is taken by a platooning system (e.g., a detection of a fault). Further, a driver may be notified that a dissolve is occurring, and in some embodiments a platooning indicator (e.g., on an exterior of a vehicle) may indicate that a platoon has dissolved. In various embodiments, safety goals described below may be accomplished by the actuation of an automated emergency braking system and/or manual brake inputs that are greater than a braking level requested/commanded by a platooning system. In various embodiments, safety goals may be detected in within substantially 0.2 seconds (e.g., +/−0.1 seconds), and a dissolve may be initiated within substantially 0.2 seconds or 0.4 seconds (e.g., +/−0.2 seconds). In some embodiments, a dissolve may be considered initiated when a rate of a gap between a front vehicle and a rear vehicle is decreasing. A dissolve may be considered complete when a headway of substantially 1.6 seconds (e.g., +/−0.3 seconds) is achieved, for example.

In some embodiments, a safety goal is avoiding decelerating less than necessary. When decelerating less than necessary is detected, a platoon may dissolve. In some embodiments, decelerating less than necessary may be detected in response to: determining that a PECU is not commanding sufficient braking relative to a threat in front of it (e.g., a vehicle), determining the existence of a hardware and/or software fault, determining a single point fault, the initiation of an automated emergency braking system, and/or a brake pedal being manually depressed such that the manual braking request exceeds the braking levels requested by a platooning system In some embodiments, a safety goal is avoiding unintended and/or excessive acceleration. Such a safety goal may be detected by: detecting that a PECU acceleration is incorrect relative to a threat in front of it (e.g., a vehicle), detecting a hardware and/or software fault, detecting a single point fault, a gap exceeds a required gap during ordinary platooning, and/or a relative velocity differential between two vehicles being greater than substantially 30 miles/hour (e.g., +/−5 miles/hour).

In some embodiments, a safety goal is avoiding unintended and/or excessive deceleration during platooning. Such a safety goal may be detected by a single point fault, a hardware and/or software fault, and/or a fault in a safety mechanism for detecting unintended or excessive deceleration. In some embodiments, brake lights shall activate (e.g., illuminate) when a platooning system initiates braking. Further, in some embodiments, a platooning system (e.g., a PECU) may stop external braking commands (e.g., from another vehicle and/or a NOC) within substantially 0.4 seconds (e.g., +/−0.2 seconds) when conditions exist that can result in excessive and/or unintended deceleration (e.g., a single point fault, which may be detected within substantially 0.2 seconds).

In some embodiments, a safety goal is avoiding inadvertent platooning. Such a safety goal may be accomplished at least in part by ensuring the absence of safety critical faults and/or conditions prior to enabling platooning, and/or detecting: an engage platoon fault, platooning after a driver initiates a disengage mechanism, platooning after a cut-in, platooning when platooning is not authorized (e.g., due to location, weather), a loss of an automated braking system's (ABS) integrity, and/or hardware and/or software faults. In some embodiments the detection of inadvertent/erroneous platooning may cause a dissolve within substantially 0.2 or 0.4 seconds.

It should be understood that the terms inadvertent and erroneous may be used interchangeably herein. For example, a platoon may inadvertently form, and/or a platoon may be platooning inadvertently. For example, a platoon may be inadvertently platooning when it continues to platoon despite a PECU detecting a system fault that would normally cause the platoon to dissolve. Similarly, a platoon may be erroneously platooning when it continues to platoon despite a PECU detecting a system fault that would normally cause the platoon to dissolve.

In some embodiments, a safety goal is to avoid failing to notify a driver of a platoon status (e.g., the platoon the driver's vehicle is a part of). A status may include a draw in, a dissolve, a disengaged, an engaged, and/or a normal platooning. Notifying a driver of a platoon status may be accomplished by conveying system status via a visual notification (e.g., a notification on a GUI on a vehicle's dashboard or a HUD), an audio notification (e.g., a beep, voice, horn), and/or a physical notification (e.g., a vibration, haptic response). Detecting such a safety goal may occur when it is determined that two or more of a visual notification, an audio notification, and a physical notification fault (e.g., by a hardware and/or software fault). In some embodiments, in response to determining a fault in one or more notification modalities (e.g., visual, audio, physical) prior to platooning, a platoon may not engage.

In some embodiments, a safety goal is to avoid vehicle instability during an intended deceleration. Such a safety goal may be accomplished at least in part by ensuring ABS integrity for and entire vehicle configuration prior to platooning, or detecting: a software and/or hardware fault and dissolving, a mismatch between a PECU and a BECU's trailer ABS integrity determinations. All of these conditions may result in a dissolve.

Safety Mechanisms

In various embodiments, a variety of safety mechanisms may be in place on a vehicle. In some cases, a platoon may dissolve, or not form, in response to a safety mechanism not operating as intended. Safety mechanisms may at least in part include, but are not limited to: a PECU heartbeat (e.g., where a PECU sends a status message at a specified regular interval, and a watchdog (e.g. a BECU) can monitor the status message and detect any faults that prevent the PECU from issuing its heartbeat within a specified amount of time); a platoon dissolve backup (e.g., where a dissolve is handled by BECU due to PECU's inability to cause a dissolve as it normally would), platooning dissolve); a platoon dissolve alert (e.g., UI/UX alerts indicating a dissolve is occurring when a PECU is unable to cause the alerts); an external brake request check (e.g., to ensure a desired external brake request is achieved (e.g., an amount, within a threshold time); ensuring braking is operating correctly using two of a DSRC signal, a radar, and a camera; monitoring gap control stability for encroachment on a minimum gap using a BECU; ensuring AEB is operating correctly; fusing radar information with camera information; updating/refreshing NOC authorization; platooning enable checks (e.g., an absence of safety faults, traveling above a threshold, having NOC authorization, having two or more vehicles indicate it is safe to platoon); counting an amount of successfully transmitted DSRC packets; ensuring that a BECU issues heartbeat messages to extended braking requests and/or a brake pedal position; counting an amount of received external brake control commands; dissolving in response to a BECU determining a PECU is not operating as desired; a PECU monitoring a status of a driver input device (DID); timestamps on video frames; a speed threshold; a brake air pressure monitor; a NOC authorization heartbeat; checking CAN data (e.g., to determine whether camera, radar, and/or fusion data is being dropped, stuck, and/or stale); BECU saturation; monitoring a yaw rate (e.g., of a trailer/$5^{th}$ wheel); PECU chip heartbeat monitoring; trailer ABS health monitoring; steering wheel monitoring; and windshield wiper monitoring.

In some embodiments, in addition to proactively dissolving when certain faults are present, both a PECU and a BECU may monitor a platooning gap and other conditions. There may be certain vehicle or environmental conditions or latent faults that cannot be indicated via J1939 that result in the system's control of the gap to be unstable. In various embodiments, a PECU and a BECU both monitor the gap independent of one another to determine if the current braking level is sufficient to avoid collision. In various embodiments, sufficiency may be defined by a braking command by a rear vehicle at exceeds the level required to avoid collision if a lead vehicle or cut-in vehicle were to apply an maximum/hard brake and the rear vehicle has some time delay and brake capacity to prevent a collision.

In some embodiments, checks must be performed before platooning is enabled. These checks may include: an ability to monitor a PECU, EECU, and BECU; the absence of platoon disable faults; confirmation of intent to platoon from two drivers; determining that a road segment authorized for platooning; platoon proximity dissolve (PXD) conditions are not present (e.g., a dissolve due to a vehicle decelerating in front of a front vehicle, and other embodiments described in U.S. patent application Ser. No. 15/926,809, which is incorporated herein in its entirety for all purposes); a measured headway is at least the minimum platoon enable headway; ABS integrity for an entire vehicle configuration (e.g., tractor & trailers) is ensured; and/or two vehicle speeds are greater than or equal to 35 mph.

In addition, in some embodiments, a safety monitor software image may update/install only occur when a vehicle's key is not in its ignition (e.g., it is in an off mode). Further, in some embodiments, safety monitor software image checksums shall be validated prior to attempting image update/installs.

As described herein, dissolving and/or disabling platooning may be caused by: driver takeover actions including switching a disengage switch, depressing a brake pedal, depressing a throttle pedal; operational dissolve conditions including cut-ins, invalid NOC authorization, insufficient lead truck headway (e.g., PXD), when wipers are active for a period of time, and/or when stability control is inactive in either truck; and/or platoon disable faults including safety critical component faults, driver takeover mechanism faults, and/or a fault in unintended platooning safety mechanisms.

Dissolve Types

It is contemplated that multiple types of dissolves are possible, including a normal controller (e.g., PECU) dissolve, a safety monitor dissolve, a platoon dissolve backup, and a retarder dissolve.

In a normal controller dissolve the PECU causes a dissolve when a driver take-over action is indicated or any fault that does not trigger one of the other dissolves is present. A safety monitor dissolve may be executed by a PECU monitoring safety by indicating a fault. A platoon dissolve backup (PDB) may be a dissolve executed by the BECU when the PECU cannot or does not cause a dissolve. A retarder dissolve may be performed by the PECU when a BECU is missing from a J1939 CAN and Proprietary (e.g., ABS) CAN. A PECU may attempt to dissolve with the retarder while alerting the driver to take back control as quickly as possible by applying foundation brakes. In a case where both J1939 and Private/proprietary/ABS CANs are down but the BECU is healthy, a "brake now" alert may be issued.

Driver Takeover Enablement

In some embodiments, in response to a system determining that conditions are safe, a PECU may enable to driver to "takeover" complete longitudinal control of the system and no longer provide (at least some) automated commands. Until this point, in some embodiments, a system will honor manual inputs when they exceed the systems generated response, but continue to command external braking requests as necessary to react to a front vehicle or a cut-in. In some embodiments, there are three conditions the system will look for to determine whether it is safe to enable driver takeover based on whether an offset is detected while platooning and a headway is sufficient. Further, in some embodiments, when takeover is enabled, a system may look for driver indicators that they are back in the loop prior to giving up control, such as a brake pedal being depressed and/or a throttle pedal being depressed for two or more seconds.

Stability Health of a Tractor-Trailer

As discussed herein, the stability health of a tractor-trailer may be required for platooning to occur. Confirmation of the stability health for the entire vehicle configuration (e.g., tractor+trailers) may detect how the number of trailers reporting healthy ABS units for comparison with a driver selected configuration by using the power-line communication (PLC) connector and standard. In some embodiments, a driver may select a configuration indicative of a number of ABS units the PLC should expect to get a healthy ABS indication from. A BECU may take the driver selected configuration reported by the PECU and compare it to the PLC count and confirm a match. A confirmation of ABS integrity is then reported back to the PECU, which indicates to the PECU that the ABS check that serves as a platoon enable condition. In some embodiments, after ABS health is confirmed and if an ABS unit indicates a faulted state while platooning a BECU may report the fault to the PECU and look for it to dissolve and perform a platoon dissolve backup if the PECU fails to do so in a timely manner.

Conformation of Driver Trailer Configuration Selection

In various embodiments, a driver or other user may select a type of trailer(s) that a tractor is towing. In various embodiments, a graphical user interface may display the type of trailer(s) that driver or other user selected. In various embodiments, a PECU may perform this operation to allow a driver to ensure they selected the correct type of trailer(s).

Example Flowchart

Figure 8:
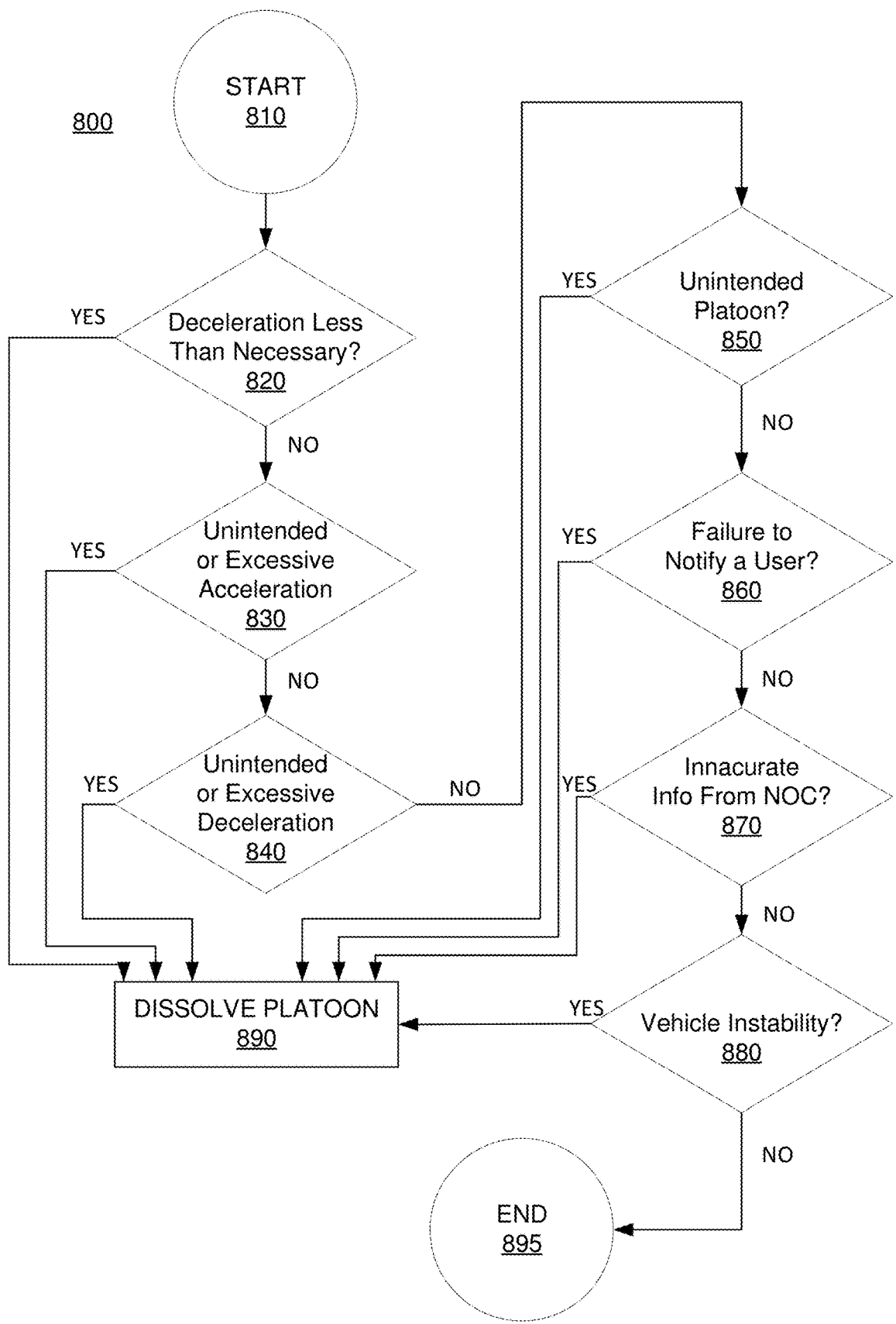
FIG. 8 illustrates a flow chart of an example process, in accordance with some embodiments.

FIG. 8 shows a flowchart 800 of a method for determining whether to dissolve a platoon, in accordance with various embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 8 should not be construed as limiting the scope of the invention. In one or more embodiments, the steps of FIG. 8 can be performed by example systems 100, 200, 300, and/or computing system 900.

In step 810, the method begins.

In step 820, a determination is made as to whether a vehicle is decelerating less than necessary. If a vehicle is decelerating less than necessary, a platoon may dissolve. If the vehicle is not decelerating less than necessary, the method may progress to step 830. A vehicle may be decelerating less than necessary if it is a rear vehicle and creates a gap between itself and a front vehicle that is less than a minimum/threshold gap.

In step 830, a determination is made as to whether a vehicle is accelerating unintendedly or excessively. If a vehicle is accelerating unintendedly or excessively, a platoon may dissolve. If the vehicle is not accelerating unintendedly or excessively, the method may progress to step 840. A vehicle may be accelerating unintendedly or excessively if it is a rear vehicle and creates a gap between itself and a front vehicle that is less than a minimum/threshold gap.

In step 840, a determination is made as to whether a vehicle is decelerating unintendedly or excessively. If a vehicle is decelerating unintendedly or excessively, a platoon may dissolve. If the vehicle is not decelerating unintendedly or excessively, the method may progress to step 850. A vehicle may be decelerating unintendedly or excessively if it is a rear vehicle and creates a gap between itself and a front vehicle that is greater than a desired/threshold amount.

In step 850, a determination is made as to whether a vehicle is platooning unintendedly. If a vehicle is platooning unintendedly, the platoon may dissolve. If the vehicle is not platooning unintendedly, the method may progress to step 860. A vehicle may be platooning unintendedly if it is not authorized to platoon, if it is platooning in an area it is not authorized to platoon in, if it is platooning on city streets, if it is platooning below a threshold speed (e.g., 30 miles/hour), if it is platooning above a threshold speed (e.g., 55 miles/hour, 60 miles/hour, 65 miles/hour, 70 miles/hour), and/or if it is platooning and either its PECU or BECU are unable to cause the vehicle's brakes to stop the vehicle.

In step 860, a determination is made as to whether a user is notified by a PECU. If the user is not notified by the PECU, a platoon may dissolve. If the user is notified by the PECU, the method may progress to step 870. A user may be notified by the PECU by receiving a notification at a graphical user interface, via an audio signal, and/or via a physical communication.

In step 870, a determination is made as to whether a vehicle is receiving inaccurate information from a NOC. If a vehicle is receiving inaccurate information from a NOC, a platoon may dissolve. If the vehicle is receiving accurate information from the NOC, the method may progress to step

880. A vehicle may be receiving inaccurate information from a NOC if a checksum is incorrect.

In step 880, a determination is made as to whether a vehicle is unstable. If a vehicle is unstable, it may dissolve. If the vehicle is not unstable, the method may progress to step 895. A vehicle may be unstable if one or more of its wheels, and/or one or more of the wheels on a trailer it is towing do not include brakes that utilize an automatic braking system.

In step 895, a platoon is dissolved. At least four types of dissolves are possible, as described above. These types of dissolves may include: a normal controller (e.g., PECU) dissolve, a safety monitor dissolve, a platoon dissolve backup, and a retarder dissolve.

In step 890, the method ends.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC, a PECU, a BECU, an EECU, a TECU, and one or more processors. According to various aspects, each of these items may include various kinds of memory, including non-volatile memory, to store one or more programs containing instructions for performing various aspects disclosed herein.

Figure 9:
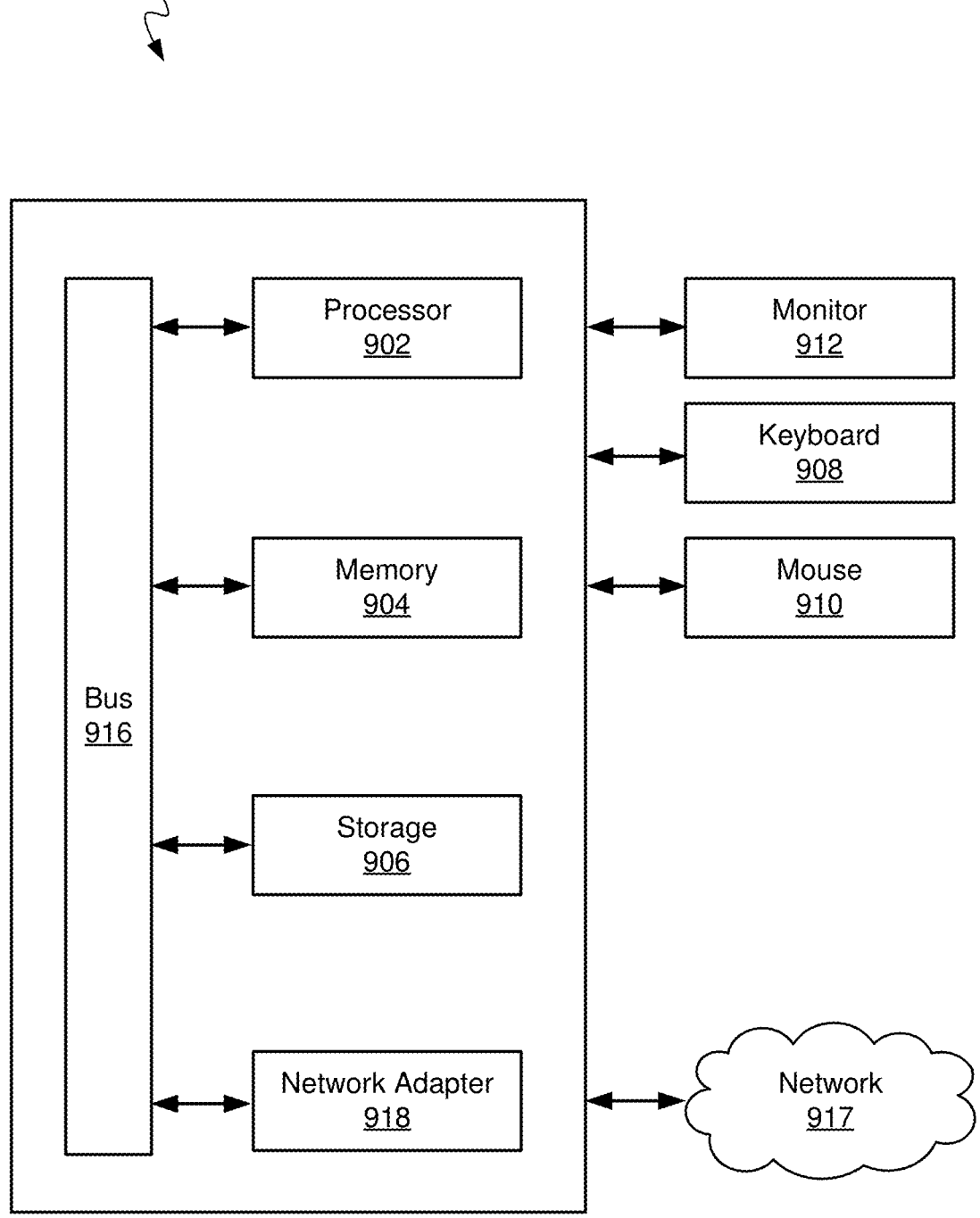
FIG. 9 illustrates an example computing system, in accordance with some embodiments.

For example, as shown in FIG. 9, example computing system 900 may include one or more computer processor(s) 902, associated memory 904 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 906 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 902 may be an integrated circuit for processing instructions. For example, the computer processor(s) may be one or more cores or micro-cores of a processor. The computing system 900 may also include one or more input device(s) 910, such as a touchscreen, keyboard, mouse, microphone, touchpad, electronic pen, or any other type of input device. Further, the computing system 900 may include one or more output device(s) 808, such as a screen (e.g., a liquid crystal display (LCD), a plasma display, touchscreen, cathode ray tube (CRT) monitor, projector, or other display device), a printer, external storage, or any other output device. The computing system 800 may be connected to a network 914 (e.g., a local area network (LAN), a wide area network (WAN) such as the Internet, mobile network, or any other type of network) via a network interface connection 918. The input and output device(s) may be locally or remotely connected (e.g., via the network 912) to the computer processor(s) 802, memory 804, and storage device(s) 906.

One or more elements of the aforementioned computing system 900 may be located at a remote location and connected to the other elements over a network 914. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for platooning comprising:
   establishing a communication link between a first vehicle and a second vehicle;
   forming a platoon including the first vehicle and the second vehicle;
   determining a plurality of safety goals, wherein the plurality of safety goals includes:

determining if a current braking level is sufficient to avoid collision, at the first vehicle, as detected by both a platoon electronic control unit (PECU) and a brake electronic control unit (BECU) on the first vehicle, wherein the PECU and the BECU detect deceleration separately;

verifying that the first vehicle is not accelerating unintendedly;

verifying that the first vehicle is not decelerating unintendedly;

avoiding inadvertent platooning after a cut-in has been detected;

verifying that notifications provided by the PECU or the BECU on the first vehicle are being transmitted to intended destinations;

verifying that information received in an update from a network operations center (NOC) at the first vehicle is correct; and verifying that the instability of the first vehicle does not exceed a threshold amount; and dissolving the platoon in response to one of the plurality of safety goals not being met.

2. The method of claim 1, wherein the platoon is dissolved by the brake electronic control unit (BECU) in response to the PECU being incapable of dissolving the platoon.

3. The method of claim 1, wherein a safety goal that is not being met is detected in within 0.2 seconds of a fault.

4. The method of claim 1, wherein dissolving the platoon is initiated within 0.2 seconds or 0.4 seconds of a detection of a safety goal not being met.

5. The method of claim 1, wherein avoiding decelerating less than necessary to avoid a collision, at the first vehicle, as detected by the PECU on the first vehicle comprises determining, at the first vehicle, a distance to a threat in front of the first vehicle.

6. The method of claim 1, wherein verifying that the first vehicle is not accelerating unintendedly comprises determining that the first vehicle is not accelerating incorrectly relative to a threat in front of the first vehicle.

7. The method of claim 1, wherein verifying that notifications provided by the PECU on the first vehicle are being transmitted to the intended destinations comprises determining that a status of a PECU is communicated to a graphical user interface.

8. The method of claim 1, wherein verifying that the instability of the first vehicle does not exceed the threshold amount comprises determining whether an automatic braking system is functioning correctly at least at one tire on the first vehicle.

9. A system for platooning comprising:
a processor;
a memory; and
an electronic control unit (ECU) configured to:
establish a communication link between a first vehicle and a second vehicle;
form a platoon including the first vehicle and the second vehicle;
determining a plurality of safety requirements, wherein the plurality of safety requirements includes:
determining if a current braking level is sufficient to avoid collision, at the first vehicle, as detected by both a platoon electronic control unit (PECU) and a brake electronic control unit (BECU) on the first vehicle, wherein the PECU and the BECU detect deceleration separately;
verifying that the first vehicle is not accelerating unintendedly;
verifying that the first vehicle is not decelerating unintendedly;
avoiding inadvertent platooning after a cut-in has been detected;
verifying that notifications provided by the PECU on the first vehicle are being transmitted to intended destinations;
verifying that information received in an update from a network operations center (NOC) at the first vehicle is correct; and
verifying that the instability of the first vehicle does not exceed a threshold amount; and
dissolving the platoon in response to one of the plurality of safety requirements not being met.

10. The system of claim 9, wherein the platoon is dissolved by the brake electronic control unit (BECU) in response to the PECU being incapable of dissolving the platoon.

11. The system of claim 9, wherein a safety requirement that is not being met is detected in within 0.2 seconds of a fault.

12. The system of claim 9, wherein dissolving the platoon is initiated within 0.2 seconds or 0.4 seconds of a detection of a safety requirement not being met.

13. The system of claim 9, wherein avoiding decelerating less than necessary to avoid a collision, at the first vehicle, as detected by the PECU on the first vehicle comprises determining, at the first vehicle, a distance to a threat in front of the first vehicle.

14. The system of claim 9, wherein verifying that the first vehicle is not accelerating unintendedly comprises determining that the first vehicle is not accelerating incorrectly relative to a threat in front of the first vehicle.

15. The system of claim 9, wherein verifying that notifications provided by the PECU on the first vehicle are being transmitted to the intended destinations comprises determining that a status of a PECU is communicated to a graphical user interface.

16. The system of claim 9, wherein verifying that the instability of the first vehicle does not exceed the threshold amount comprises determining whether an automatic braking system is functioning correctly at least at one tire on the first vehicle.

17. A method for platooning comprising:
establishing a communication link between a first vehicle and a second vehicle;
forming a platoon including the first vehicle and the second vehicle;
determining a plurality of safety requirements, wherein the plurality of safety requirements includes:
the first vehicle is not inadvertently platooning after a cut-in has been detected;
the first vehicle is traveling at a speed not less than 35 miles per hour;
a speed of windshield wipers does not exceed a threshold amount;
one or more tires are not overinflated;
an amount of braking requested by a manual brake request is not greater than an amount of braking requested by a platooning electronic control unit (PECU);
either the brake electronic control unit (BECU) or the PECU is able to apply brakes at the first vehicle, wherein the PECU and the BECU detect deceleration separately;

brake lights on the first vehicle are activated in response to the PECU applying brakes at the first vehicle;

authorization received from a network operations center (NOC) at the first vehicle is updated at a threshold frequency; and a temperature of a brake on the first vehicle is not above a threshold amount; and dissolving the platoon in response to one of the plurality of safety requirements not being met.

18. The method of claim 17, wherein the PECU comprises an electronic control unit (ECU) configured to determine whether platooning is enabled, and wherein a determination as to whether platooning is enabled comprises determining whether a driver is able to takeover longitudinal controls of a vehicle.

\* \* \* \* \*